(12) United States Patent
Raman et al.

(10) Patent No.: US 8,880,226 B2
(45) Date of Patent: Nov. 4, 2014

(54) SYSTEM AND METHOD TO PREDICT OPTIMIZED ENERGY CONSUMPTION

(75) Inventors: Thirumal Raman, Coimbatore (IN); Sundararaman Venkateswaran, Chennai (IN); Paramesh Muthuraj, Salem (IN)

(73) Assignee: Honeywell International Inc., Morristown, NJ (US)

( * ) Notice: Subject to any disclaimer, the term of this patent is extended or adjusted under 35 U.S.C. 154(b) by 625 days.

(21) Appl. No.: 13/109,459

(22) Filed: May 17, 2011

(65) Prior Publication Data

US 2012/0296480 A1 Nov. 22, 2012

(51) Int. Cl.
G05D 23/19 (2006.01)
G05B 13/02 (2006.01)
F24F 11/00 (2006.01)

(52) U.S. Cl.
CPC ..... *G05D 23/1934* (2013.01); *F24F 2011/0075* (2013.01); *G05B 13/026* (2013.01)
USPC ............................. 700/277; 700/291; 700/295

(58) Field of Classification Search
None
See application file for complete search history.

(56) References Cited

U.S. PATENT DOCUMENTS

| 2008/0314998 | A1* | 12/2008 | Herzon et al. | 236/1 C |
|---|---|---|---|---|
| 2010/0088261 | A1 | 4/2010 | Montalvo | |
| 2010/0100253 | A1 | 4/2010 | Fausak | |
| 2010/0235004 | A1* | 9/2010 | Thind | 700/277 |
| 2011/0106327 | A1* | 5/2011 | Zhou et al. | 700/291 |

OTHER PUBLICATIONS

"Cooper Power Systems—Demand Response Services", [online]. [retrieved Dec. 27, 2012]. Retrieved from the Internet: <URL: http://www.cooperindustries.com/content/public/en/power_systems.html>, (2012), 3 pgs.
"Honeywell Energy Manger tm—Energy Management Services—Honeywell Energy Services", [online]. [retrieved on Dec. 27, 2012]. Retrieved from the Internet: <URL: http://www.honeywellenergy.co.uk/Solutions/113/Energy-Management-Services.aspx>, 1 pg.
"Honeywell Engineering Manual of Automatic Control for Commercial Buildings", (Oct. 1997), 517 pgs.
Motegi, N., et al., "Introduction to Commercial Building Control Strategies and Techniques for Demand Response", *LBNL-59975, Ernest Orlando Lawrence Berkeley National Laboratory*, (May 2007), 76 pgs.
Roth, K. W., et al., "Energy Consumption Characteristics of Commercial Building HVAC Systems vol. III: Energy Savings Potential", *TIAX Reference No. 68370-00*, (Jul. 2002), 285 pgs.
Watson, D. S., "Strategies for Demand Response in Commercial Buildings", *Proceedings of the 2006 ACEEE Summer Study on Energy Efficiency in Buildings*, (Pacific Grove, CA, Aug. 13-18, 2006), 14 pgs.

* cited by examiner

*Primary Examiner* — Ryan Jarrett
(74) *Attorney, Agent, or Firm* — Schwegman Lundberg & Woessner, P.A.

(57) ABSTRACT

A system receives an energy demand response schedule, one or more user preferences, and one or more predicted environmental variables into a computer processor. The system generates an optimized energy schedule as a function of the demand response schedule, the user preferences, and the predicted environmental variables. The optimized energy schedule includes one or more of a set point temperature variation in one or more zones, an air handling unit set point temperature variation, a chilled water set point temperature variation, a carbon dioxide level set point variation, a pre-cooling time shift, a pre-cooling duration variation, and a load based optimized chiller schedule. The system transmits the optimized energy schedule to a building management server.

14 Claims, 7 Drawing Sheets

SYSTEM AND METHOD TO PREDICT OPTIMIZED ENERGY CONSUMPTION

TECHNICAL FIELD

The present disclosure relates to a system and method to optimize energy consumption.

BACKGROUND

Electrical energy is becoming a predominant resource for use in buildings and facilities. Day by day electricity usage exponentially increases. Unfortunately, electricity is becoming more and more expensive. Consequently, there is a need to optimize energy consumption.

DETAILED DESCRIPTION

As noted above, energy optimization in buildings and other facilities is critical in order to minimize energy consumption and energy costs. There are several potential key problems that buildings and facilities management encounter in the management of their energy usage and cost. First, energy is becoming more costly. Energy optimization is therefore becoming more critical. Additionally, due to the scarcity of natural resources, energy generation is becoming costly. This cost has been passed down to energy consumers, wherein such consumers are charged based upon the demand in the electricity grid.

Second, electric utility normal demand response (DR) programs operate on a fixed schedule. The hourly based peak pricing is normally published by an electric utility a day in advance. Current energy minimization systems operate only in the peak period and minimize energy consumption using a fixed DR schedule. Additionally, current systems do not generate an optimized energy schedule based upon different DR methods. However, as explained below, one or more embodiments minimize energy consumption outside of the DR schedule.

Third, current attempts to conserve energy require an energy analyst to interpret the energy data. Current systems collect device logs and generate reports based upon those logs. After this, the energy analyst analyzes the report and suggests measures to reduce energy consumption. Based upon the input of the energy analyst, the site technician takes corresponding action.

Fourth, there is currently no way for a site technician to visualize any predicted energy savings. Current systems predict energy savings only after deployment of any energy saving methods. That is, there is no way to predict energy savings before the deployment of any energy saving methods.

These shortcomings can be solved by minimizing power usage. Current practice is to apply methods to minimize energy usage in a discrete manner. However, it is only after the demand period that any realized energy savings are analyzed based upon the methods that were deployed in the facility/building. To solve this problem, an embodiment predicts energy savings in the facility/building based upon the demand response (DR) schedule, and also upon user preferences and environmental factors.

In an embodiment, a system predicts energy savings by suggesting the appropriate energy optimization method or methods by analyzing the DR schedule, user preferences, and predicted environmental values like outdoor air temperature. Based upon the recommended energy optimization methods, energy savings can be predicted. The embodiment includes different demand response algorithms, an energy optimized schedule generator, and a data points database that contains the power rating details.

Figure 1:
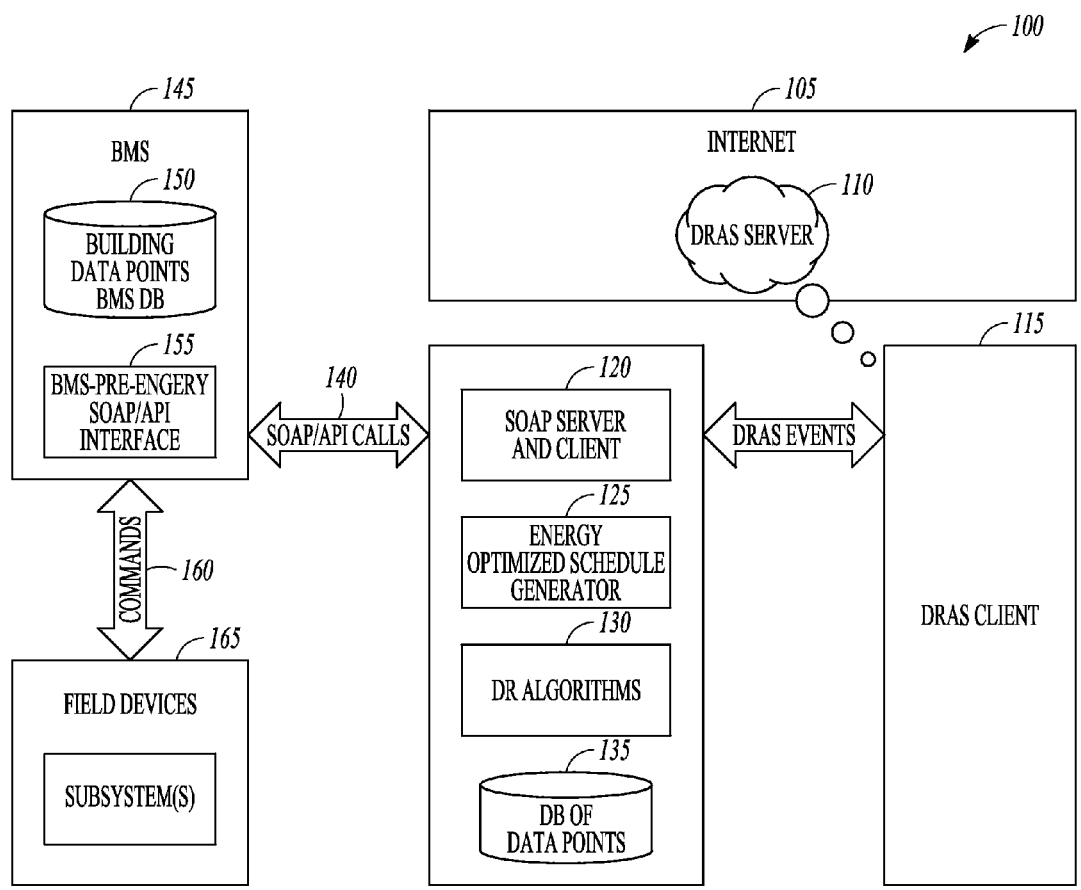
FIG. 1 is a block diagram of an example embodiment of a system to predict optimized energy consumption.

Such a system 100 is illustrated in FIG. 1. On the macro level, the system 100 includes a demand response server 110, a demand response client 115, and a building management server 145. The demand response client 115 is coupled to the demand response server 110 via the Internet 105. The demand response server interacts with a SOAP server 120, which is associated with an energy optimized schedule generator 125, a module of demand response algorithms 130, and a data base of data points 135. The demand response client 115 and/or SOAP server 120 communicate with the building management server 145 via SOAP or API calls 140. The building management server 145 includes a building data points data base 150 and a SOAP/API interface 155. The building management server 145 issues commands 160 to field devices 165, such as a thermostat for which the set point is altered.

In an embodiment, the system 100 operates as follows. The demand response client 115 gets a demand response (DR) schedule from the demand response server 110. The demand response server 110 is normally maintained by the electric utility. An electric utility normally makes such demand response schedules available a day ahead. The energy optimized schedule generator 125 generates the energy optimized next day schedule for the facility/building. Specifically, the energy optimized schedule generator 125 evaluates multiple stored DR algorithms 130. After the stochastic analysis, the optimized energy schedule is created. The generated optimized energy schedule and predicted energy savings is displayed to the user. At this point, the user can optimize or change the DR methods parameters to ensure a minimum energy savings or ensure minimum occupant comfort to achieve better energy savings. Once the user confirms the schedule, the schedule will be sent to BMS 145, although this is optional and can be omitted so as to minimize the end user intervention. The optimized schedule is transmitted to the building management system 145 either via API calls or via SOAP communication 140. Based upon the optimized schedule, the BMS 145 schedules the sub systems 165 to achieve the energy savings.

There are several different demand response algorithms 130 that can be used to generate the optimized schedule. These include a zone temperature set point adjustment, an air handling unit (AHU) temperature set point adjustment, a chilled water temperature set point adjustment, a $CO_2$ level set point adjustment, a pre-cooling algorithm, and a load based chiller scheduling. Additionally, there are algorithms to allow for continuous optimization including a set point adjustment based upon rate of change of a room temperature, and a $CO_2$ level set point adjustment based upon a rate of change of $CO_2$ (normally measured in parts per million (ppm)).

In an embodiment, the zone temperature set point adjustment/elevation is handled as follows. During the peak demand period, the zone set point temperature can be elevated by a delta temperature (delta temperature can be 1° F. or 2° F. or even more than 2° F. that can be predicted by the algorithm)

to minimize the energy consumption. The temperature elevation can be absolute where the set point can be elevated to a fixed set point value, or it can be relative where the set point temperature can be elevated by a delta value. By elevating the set point temperature the cooling load can be reduced and hence the energy consumption can be reduced.

In another embodiment, the air handling unit (AHU) temperature set point adjustment/elevation and the chilled water set point temperature adjustment/elevation is handled as follows. During the peak demand period, the AHU set point temperature and chiller water set point temperature can be elevated by a delta temperature (delta temperature can be 1° F. or 2° F. or even more than 2° F. that can be predicted by the algorithm) to minimize the energy consumption. The temperature elevation can be absolute where the set point can be elevated to a fixed set point value, or it can be relative where the set point temperature can be elevated by a delta value. This set point elevation can be determined based upon the number of zones. By elevating the set point temperature, the cooling load can be reduced and hence the energy consumption can be reduced.

In an embodiment, the carbon dioxide level set point adjustment/elevation can be handled as follows. During the peak demand period the $CO_2$ level set point can be elevated. By elevating the $CO_2$ set point level, it closes the outside air damper to its maximum and re-circulates the cooled air until it reaches the $CO_2$ set point threshold level, thereby reducing the thermal load to the AHU and chiller/heater. In a specific embodiment, the algorithm is as follows.

1. Sort a charge rate table $(x_1, x_2, x_3 \ldots x_n)$.
2. Get the nominal electricity tariff from the customer (Y).
3. Get the maximum (UL) and minimum (LL/SP) value of $CO_2$ in ppm.
4. Find the average of $x_1$ & $x_n$ $((x_1 + x_n)/2 = R)$.
5. Find out the number of charge rate variations (Z) which are above the nominal value (Y).
6. Find the amount of $CO_2$ value change (increase/decrease) for each charge rate period $((UL - LL)/Z = S)$.
7. If the outdoor air temperature is less than the rated set point temperature, decrease the $CO_2$ set point value.
   If (x[n] > Y)
   {
   Q=Position of x[n] from Y
   CSP=LL+S*Q /* CSP is the carbon dioxide set point */
   n++
   }
   Else if (x[n] < Y)
   {
       If (OAT < RAT SP) /* OAT is Outside Air Temperature; RAT is Return Air Temperature */
       {
           Q=Position of x[n] from Y
           CSP=LL-S*Q
           n++
       }
   }

In an embodiment, pre-cooling is a method to cool the facility/building below the set point temperature in order to store thermal energy at a reduced energy cost. This can be done before the peak DR period. A result of this method is that, even if the set point temperature has been elevated, the occupants comfort can be maintained with the help of the pre-cooled stored thermal energy. The effect is that pre-cooling shifts the thermal load to a non peak period, but still it's able to maintain the occupants comfort, and it reduces the energy cost.

The chiller consumes most of the energy in an HVAC system. A load based chiller scheduling helps to achieve the maximum energy savings and can be handled as follows. In an HVAC system, the chiller operation can be optimized to yield maximum energy savings with the help of the following parameters. The load of the chiller can be predicted based on the AHU set point variation and the chilled water set point variation (L). The flow rate of the chiller unit can be predicted based on the average temperature difference between the supply air/return air and the average set point of all the AHUs installed in the site.

$$q = k1(T_{AHUsupp/ret} - T_{AHUSP}) \text{ CFM}$$

Where, $T_{AHUsupp/ret}$=average supply air/return air temperature of AHUs ° C.

$T_{AHUSP}$=average set point of AHUs ° C.

$k_1$=proportionality constant q=Flow rate of the chiller in CFM

The AHU set point schedule has been derived based on the power cost schedule obtained from the DR. While running on this schedule, when the set point is changed from $T_1$ to $T_2$, the chilled water valve position will be automatically adjusted by the control logic. This change in set point will directly affect the flow rate of the chilled water.

For an ideal HVAC system, when the set point temperature is varied from $T_1$ to $T_2$, the supply air temperature or return air temperature of the AHU should be at $T_1$ and the set point temperature of the AHU should be at $T_2$. So at any instant of time that the set point is varied, the difference between the previous set point and the new set point will be $T_{AHusupp/ret} - T_{AHUSP}$. Now the difference between the supply chilled water temperature (SWT) and the return chilled water temperature (RWT) at the AHU can be predicted based on the following relation.

$$dt = RWT - SWT \ ° C.$$

Similar to the AHU set point schedule, the chiller set point is also predicted and optimized based on the power cost schedule from the DR. Hence the change in supply and return water temperature can be computed from the chiller set point schedule.

For a chiller unit, $$L = k \ q \ dt \ \text{Tonnes}$$

Where L=Load of the chiller in Tonnes k=proportionality constant q=Flow rate of water in the chiller in CFM dt=difference between Supply Chilled Water Temperature (SWT) and Return Chilled Water Temperature (RWT) ° C.

So the expected load on the chiller unit can be predicted at a given time interval based on the predicted values of set point schedules.

The chiller operation can also be optimized to yield maximum energy savings by considering the number of chillers installed and the individual Tonnes Rating (TR) of each installed chiller. For this factor, it is necessary to know the number of chillers installed in a facility and their individual ratings (Tonnes/KW). The typical maintenance schedule of individual chiller units can also be considered. Normally, the chiller units will have a scheduled maintenance plan according to the number of hours of operation. If any chiller unit needs maintenance, other chillers should be able to operate by taking additional loads. With the help of this information, the chiller operation can be much more optimized.

The continuous maximum runtime of each chiller unit can also be taken into consideration. Each chiller needs to undergo maintenance after a certain operation time period. The chiller unit will operate at maximum efficiency if it is partly loaded. After predicting the load (Tonnes required) of the chiller unit, the algorithm will decide on which chiller unit or units to be selected for running at this load value. Based on the required Tonnes predicted, the chiller units are ranked. Then the chiller units are selected for operation based on their individual run time.

An algorithm for the chiller units is as follows.

Figure 2:
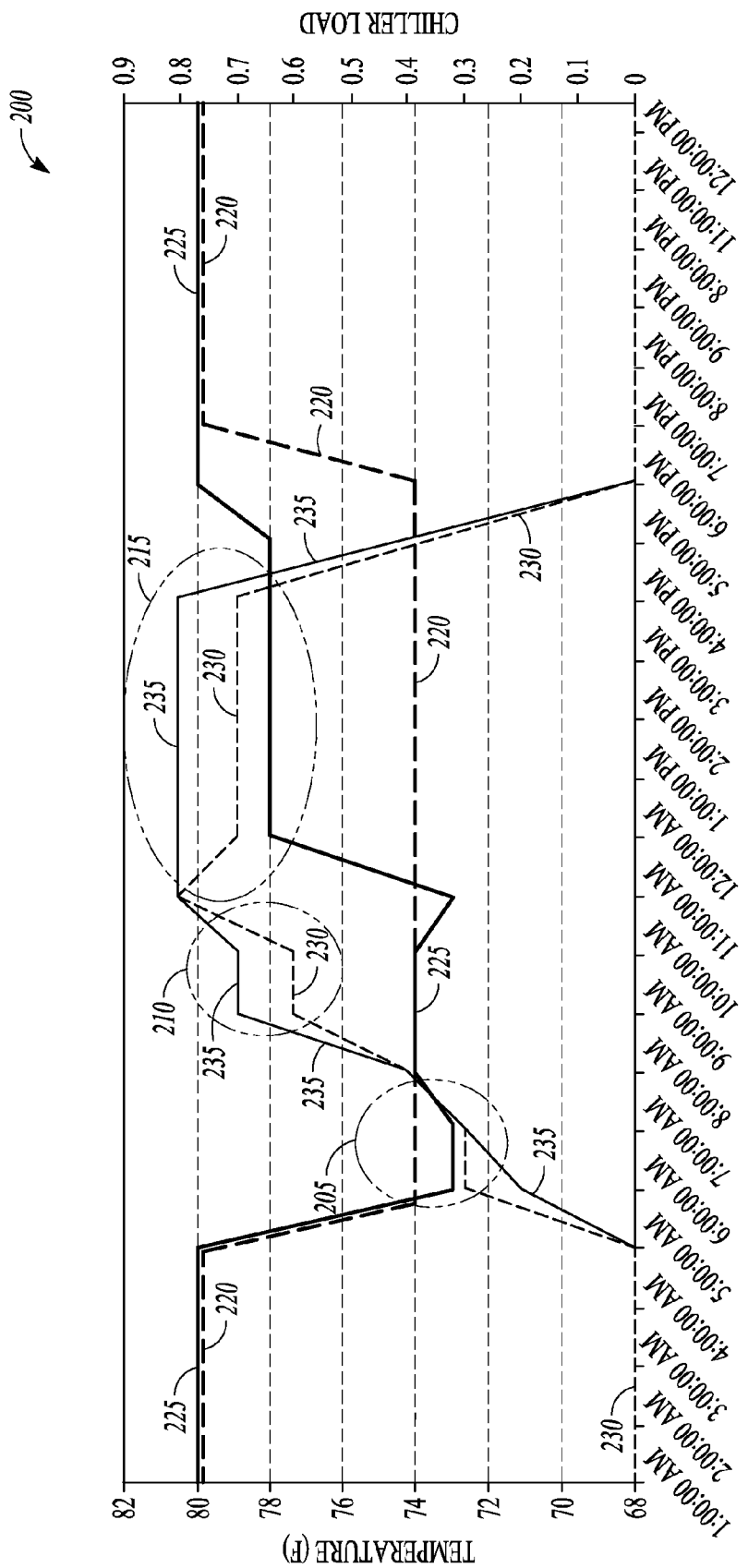
FIG. 2 is a graph of an optimized energy schedule.
Figure 3A:
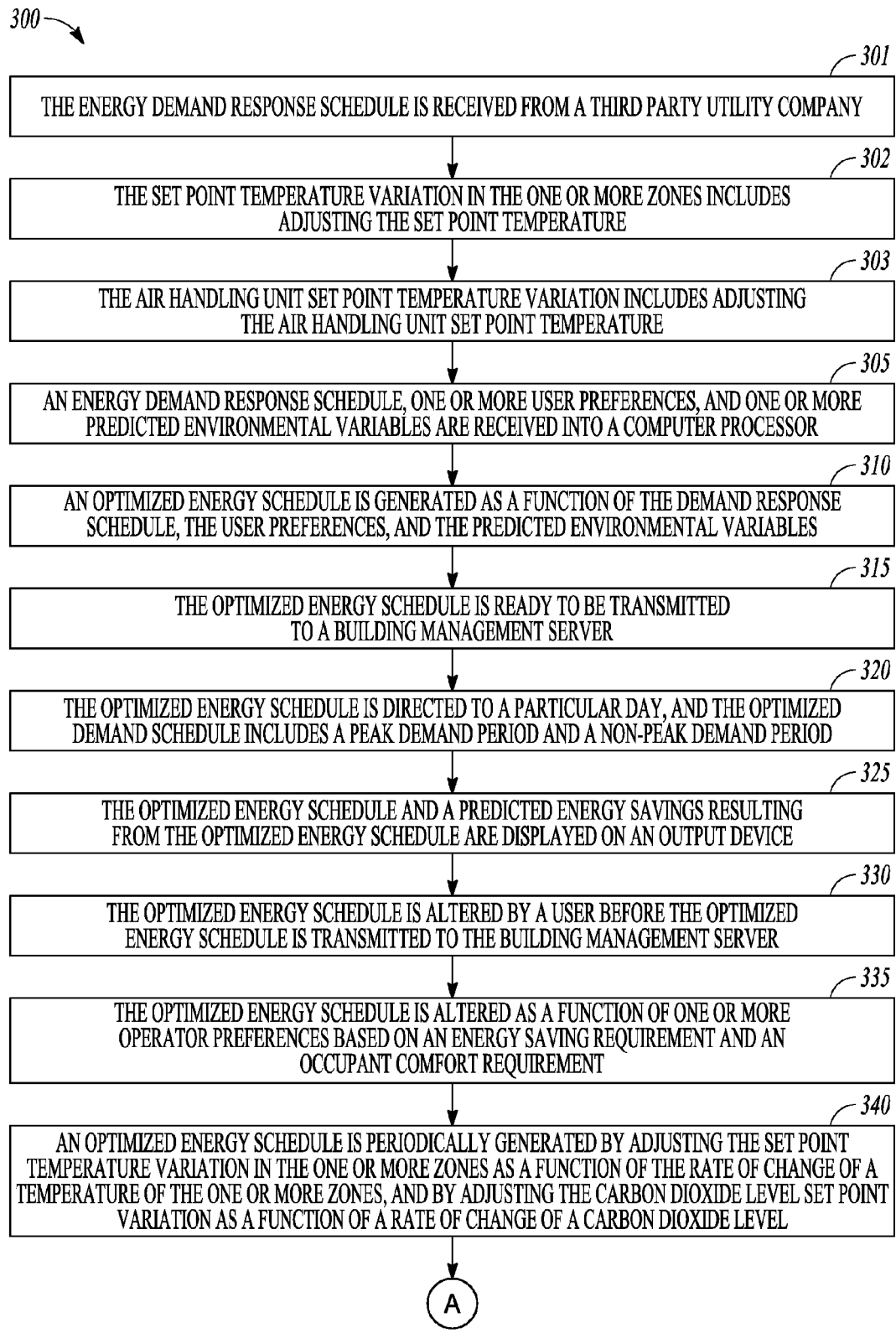
FIGS. 3A and 3B are a flowchart of an example process to optimize energy consumption.
Figure 3B:
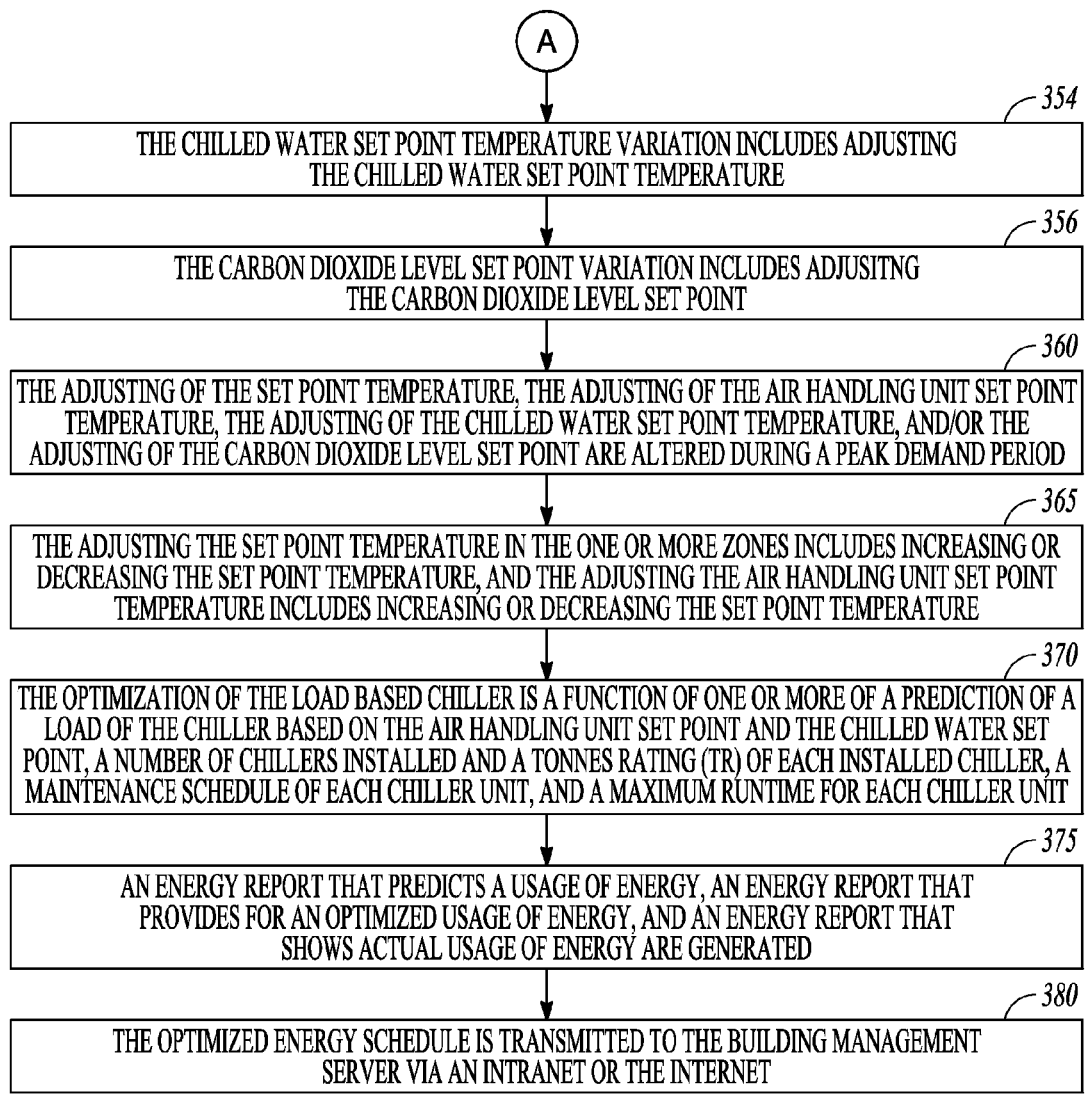
Figure 4A:
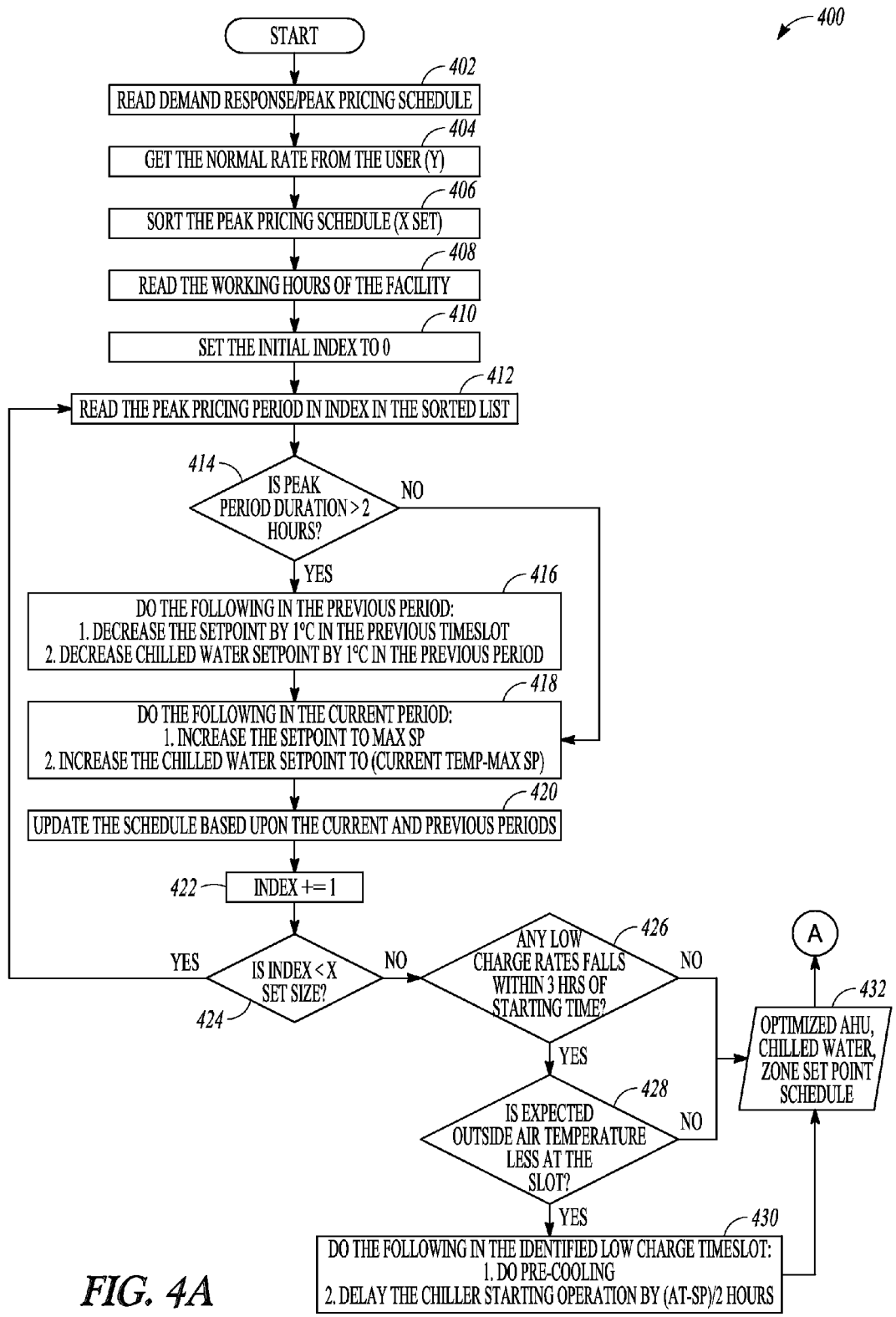
FIGS. 4A, 4B and 4C are a flowchart of another example embodiment of a process to optimize energy consumption.
Figure 4B:
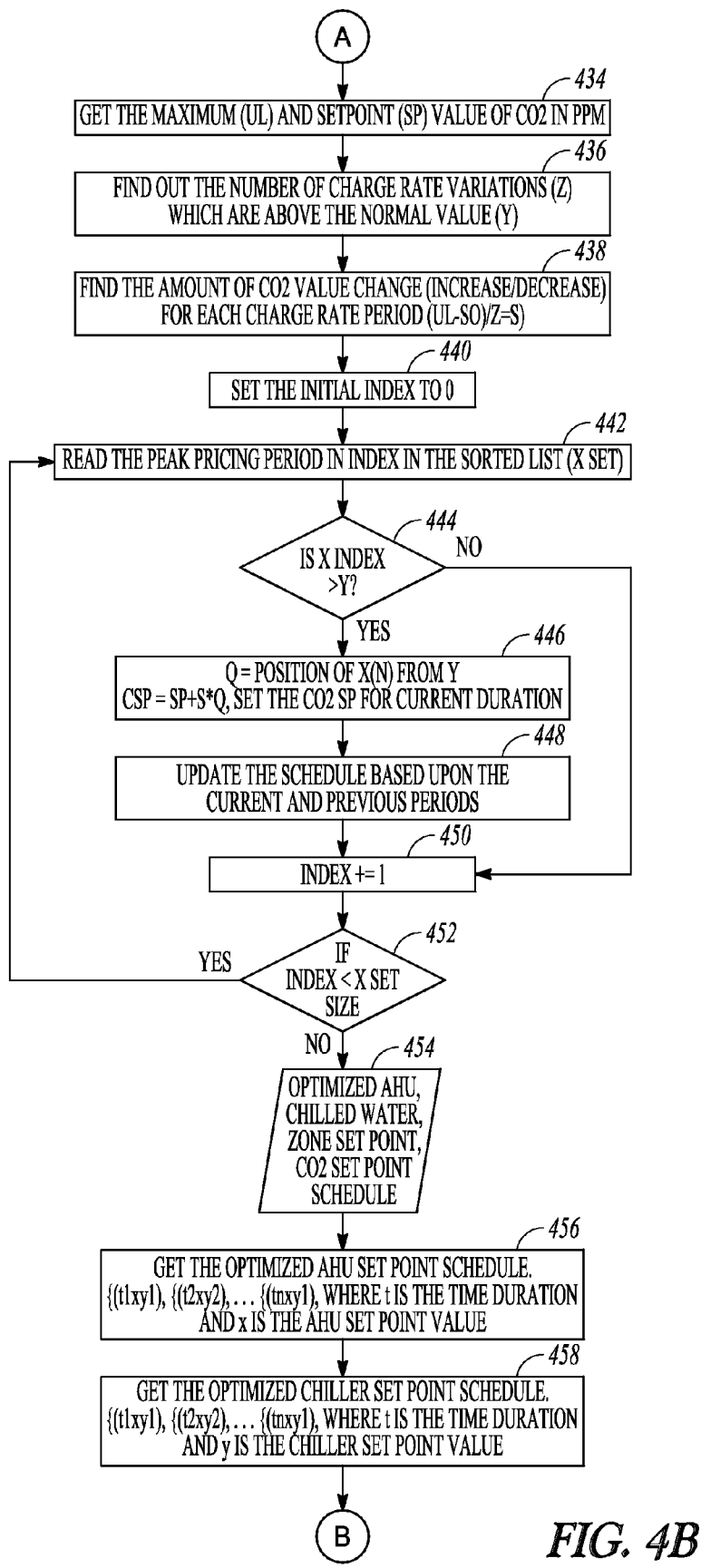
Figure 4C:
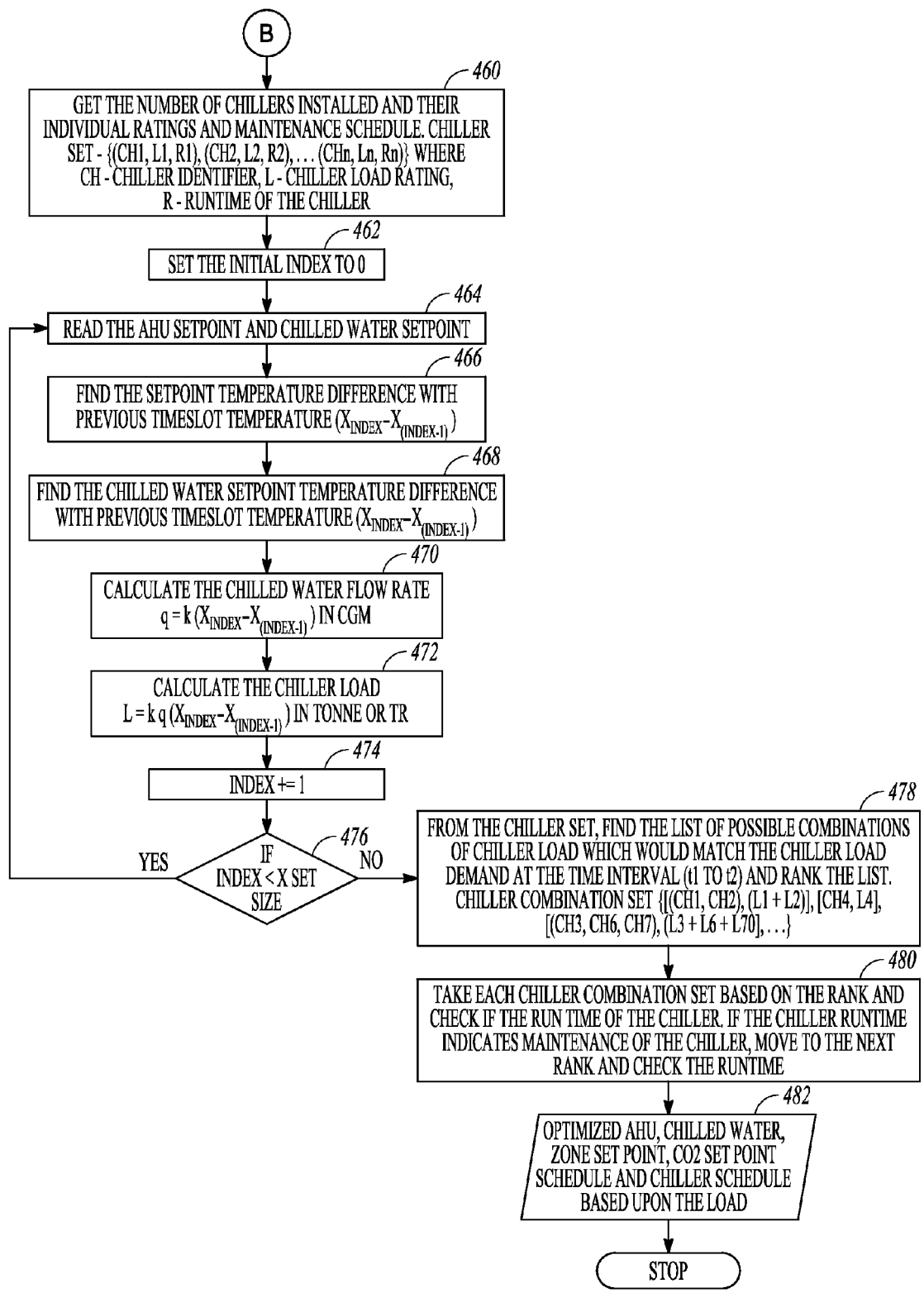

FIG. 2 shows a typical energy optimized schedule output 200 that considers pre-cooling and set point temperature elevation. The site configurations are:
1. Working time 8 AM to 5 PM
2. Peak period 12 PM to 4 PM
3. $CO_2$ ppm set point 500
4. Zone set point temperature 74° F.

---

Start:
1: Get the optimized AHU set point schedule. $\{(t_1, x_1), (t_2, x_2), \ldots (t_n, x_n)\}$ where t is the time duration and x is the AHU set point value.
2: Get the optimized Chiller set point schedule. $\{(t_1, y_1), (t_2, y_2), \ldots (t_n, y_n)\}$ where t is the time and y is the Chiller set point value.
3: Get the number of chillers installed and their individual ratings and maintenance schedule. Chiller Set—$\{(ch_1, L_1, R_1), (ch_2, L_2, R_2), \ldots (ch_n, L_n, R_n)\}$ where ch—chiller identifier, L—chiller load rating, R—run time of the chiller.
4: During the transition from $t_1$ to $t_2$, get the value of AHU set point temperature before changing ($x_1$) and the changed AHU set point temperature ($x_2$).
5: Find the difference between $x_1$ and $x_2$. ($x_1 - x_2$). This is equivalent to the change in supply air temperature and return air temperature of AHU at the instance $t_1$.
6: Calculate the Chilled water flow rate at this time interval ($t_1$ to $t_2$) using the formula:
q = k ($x_1 - x_2$) in cfm
7: From the start time of the schedule, find Chiller Set point variation at the time interval ($t_1$ to $t_2$).
8: Get the value of Chiller set point temperature before changing ($y_1$) and the changed Chiller set point temperature ($y_2$) at time interval ($t_1$ to $t_2$).
9: Find the difference between $y_1$ and $y_2$. ($y_1 - y_2$) This is equivalent to the change in supply water temperature and return water temperature of Chiller (dt) at time interval ($t_1$ to $t_2$).
10: Calculate the chiller load at time interval ($t_1$ to $t_2$) with the formula:
L = k q dt in tonne or TR
11: From the chiller set, find the list of possible combinations of Chiller loads that would match the Chiller Load demand at the time interval ($t_1$ to $t_2$) and rank the list.
Chiller combination set $\{ [(ch_1, ch_2),(L_1 + L_2)], [ch_4, L_4], [(ch_3, ch_6, ch_7),(L_3 + L_6 + L_7)], \ldots \}$
12: Take each chiller combination set based on the rank and check the run time of the chiller. If the chiller runtime indicates maintenance of the chiller, move to the next rank and check the runtime.
    For each item in Chiller combination set
        For each chiller in the chiller combination
            If Runtime >= MaxRuntime then
                Do not select the chiller set
                Stop Iteration
            End
        End
        If this chiller set is not selected
            Continue to next item
        Else
            This chiller item selected
            Stop iteration
        End
    End
13: After finding the chiller set based on run time, set the run time of the chillers during the time interval ($t_1$ to $t_2$). - Add this schedule to Chiller schedule Set
Chiller Schedule Set $\{ [(t_1, t_2), (ch_1, ch_2)], [(t_2, t_3), (ch_4, ch_7, ch_8)] \ldots \}$
14: Continue to repeat from Step 4 till the end of the AHU set point schedule and Chiller Set Point schedule.
End

---

In an embodiment, the set point temperature adjustment is based upon the room temperature rate of change. The room set point temperature can be adjusted automatically to gain additional energy savings based upon the thermal load in the room. If the actual room temperature is declining, it's very clear that thermal load in the room is greater than the cooling load (i.e., there are less occupants in the room). Hence the set point temperature can be elevated to match the cooling load. If the actual room temperature is increasing, the thermal load in the room is less than the cooling load, and the set point temperature can be decreased to match the cooling load.

In another embodiment, the $CO_2$ set point adjustment is based upon $CO_2$ ppm rate of change. If the $CO_2$ level as measured in ppm is declining, the $CO_2$ set point can be elevated. If the $CO_2$ ppm rate of change is increasing, the $CO_2$ set point can be reduced.

5. Chilled water set point temperature 60° F.

In FIG. 2, the weekday temperature set point is indicated by line 220, the optimized weekday temperature set point is indicated by line 225, the optimized chiller load is indicated by line 230, and the normal chiller load is indicated by line 235. FIG. 2 further illustrates three different regions that have been highlighted in the graph—205, 210, and 215. These three different regions signify how the thermal load and energy demand has been reduced to achieve better energy savings.

The region 205 applies a pre-cooling technique to reduce the energy consumption. In this example, pre-cooling has been applied between 6 am and 8 am. During this time period the outside air temperature will be less than or equal to the set point temperature, and therefore the cooling load will be less. The energy cost also will be less since it is operating in the non-peak period. The thermal energy will be stored in the facility, and when the facility is getting ready for occupation, the cooling load will be less since thermal energy has been already stored in the facility. Consequently, the pre-cooling technique also reduces the power consumption during the time that the building is occupied by more people.

The region 210 has less of a cooling load due to the storing of thermal energy in region 205. Consequently, during the time period of region 210, less power is consumed (during the time period of greatest occupation by people)

The region 215 shows a peak demand period for the facility. Before the peak period, the pre-cooling method has been applied to store the thermal energy to reduce the cooling load during the peak demand period. During the peak period, set point temperature has been elevated by the delta temperature to reduce the cooling load. Consequently, the cooling load has been reduced by the set point temperature elevation and the pre-cooling method, and significant cooling load reduction is realized and that leads to an energy reduction during the DR peak period. The overall energy demand and energy cost can be reduced for a facility by a significant amount.

FIGS. 3A, 3B, 4A, 4B, and 4C are flowcharts of example processes 300, 400 of predicting optimized energy consumption. FIGS. 3A, 3B, 4A, 4B, and 4C include a number of process blocks 301-380 and 402-482. Though arranged serially in the example of FIGS. 3A, 3B, 4A, 4B, and 4C, other examples may reorder the blocks, omit one or more blocks, and/or execute two or more blocks in parallel using multiple processors or a single processor organized as two or more virtual machines or sub-processors. Moreover, still other examples can implement the blocks as one or more specific interconnected hardware or integrated circuit modules with related control and data signals communicated between and through the modules. Thus, any process flow is applicable to software, firmware, hardware, and hybrid implementations.

Referring specifically to FIG. 3, at 301, the energy demand response schedule is received from a third party utility company. At 302, the set point temperature variation in the one or more zones includes adjusting the set point temperature. At 303, the air handling unit set point temperature variation includes adjusting the air handling unit set point temperature. At 305, an energy demand response schedule, one or more user preferences, and one or more predicted environmental variables are received into a computer processor. At 310, an optimized energy schedule is generated as a function of the demand response schedule, the user preferences, and the predicted environmental variables. The optimized energy schedule includes one or more of a set point temperature variation in one or more zones, an air handling unit set point temperature variation, a chilled water set point temperature variation, a carbon dioxide level set point variation, a pre-cooling time shift, a pre-cooling duration variation, and a load based optimized chiller schedule. At 315, the optimized energy schedule is ready to be transmitted to a building management server.

At 320, the optimized energy schedule is directed to a particular day, and the optimized demand schedule includes a peak demand period and a non-peak demand period. At 325, the optimized energy schedule and a predicted energy savings resulting from the optimized energy schedule are displayed on an output device. At 330, the optimized energy schedule is altered by a user before the optimized energy schedule is transmitted to the building management server. At 335, the optimized energy schedule is altered as a function of one or more operator preferences based on an energy saving requirement and an occupant comfort requirement. At 340, an optimized energy schedule is periodically generated by adjusting the set point temperature variation in the one or more zones as a function of the rate of change of a temperature of the one or more zones, and by adjusting the carbon dioxide level set point variation as a function of a rate of change of a carbon dioxide level. At 354, the chilled water set point temperature variation includes adjusting the chilled water set point temperature. At 356, the carbon dioxide level set point variation includes adjusting the carbon dioxide level set point.

At 360, the adjusting of the set point temperature, the adjusting of the air handling unit set point temperature, the adjusting of the chilled water set point temperature, and/or the adjusting of the carbon dioxide level set point are altered during a peak demand period. At 365, the adjusting the set point temperature in the one or more zones includes increasing or decreasing the set point temperature, and the adjusting the air handling unit set point temperature includes increasing or decreasing the set point temperature. At 370, the optimization of the load based chiller is a function of one or more of a prediction of a load of the chiller based on the air handling unit set point and the chilled water set point, a number of chillers installed and a Tonnes rating (TR) of each installed chiller, a maintenance schedule of each chiller unit, and a maximum runtime for each chiller unit. At 375, an energy report that predicts a usage of energy, an energy report that provides for an optimized usage of energy, and an energy report that shows actual usage of energy are generated. At 380, the optimized energy schedule is transmitted to the building management server via an intranet, the Internet, or any known software messaging methods.

Referring now to FIG. 4, at 402, a demand response/peak pricing schedule is read. At 404, the normal rate is obtained from the user. This rate is designated as Y. At 406, the peak pricing schedule is sorted, and this results in an X set. At 408, the working hours of the facility are read, and at 410, the initial index is set to zero. At 412, the peak pricing period index in the sorted list is read. At 414, a check is made to see if the duration of the peak period is greater than a threshold, such as two hours. If the duration of the peak period is greater than the threshold (two hours), then at 416, in the previous time period, the set point is decreased by a set amount in the previous time slot, and the chilled water set point is decreased by a set amount in the previous period. If the duration of the peak period is not greater than the threshold (e.g., two hours), then at 418, in the current time period, the set point is increased to a maximum set point, and the chilled water set point is increased. In an embodiment, the chilled water set point increase is determined by subtracting the maximum set point by the current temperature. At 420, the schedule is updated based upon the current and previous periods. An index is incremented at 422, and at 424, if the index is less than the X set size, then execution returns to block 412. If the index is not less than the X set size, then at 426 and 428 respectively, if either any low charge rates fall within three hours of the start time and the expected outdoor air temperature is less at the slot, then at 430, in the identified low charge time slot, invoke the pre-cooling, and delay the chiller starting operation. In an embodiment, the chiller starting operation is delayed by (AT−SP)/2 hours, wherein AT is the actual temperature. After the execution of one or more of 426, 428, and 430, at 432, an optimized AHU, chilled water, and zone set point schedule are generated.

At 434, the maximum or upper limit and set point value of carbon dioxide is obtained. This value is in parts per million (ppm). At 436, the number of charge rate variations (Z) that are above the normal value (Y) is determined. At 438, the change in the carbon dioxide value (i.e. an increase or a decrease) for each charge rate period is determined. This can be determined by subtracting the SP (set point) from the carbon dioxide upper limit, and dividing that difference by the number of charge rate variations (Z). At 440, an index is set to zero, and at 442, the peak pricing record index in the sorted list (X set) is read. At 444, if the X index is less than or equal to the normal value (Y), the index is incremented at 450. If the X index is greater than the normal value (Y), then at 446, a value of Q is set to the position of X(N) from Y, and CSP is calculated by adding SP to the product of S and Q. This sets the carbon dioxide SP for the current duration. At 448, the schedule is updated based upon the current and previous periods. At 450, the index is incremented once again, and at 452, if the index is less than the X set size, then execution returns to block 442. If the index is greater than or equal to the X set size, then at 454, the optimized AHU, chilled water, zone set point, and carbon dioxide set point schedules are generated.

Continuing with process 400 at 456, the optimized AHU set point schedule is retrieved. This schedule includes a time duration and a AHU set point value. At 458, the optimized chiller set point schedule is retrieved. This schedule includes a time duration and a chiller set point value. At 460, the number of installed chillers, the individual ratings of the installed chillers, and the maintenance schedule is retrieved.

At 462, an index is initialized to zero. At 464, the AHU set point and chilled water set point are retrieved. At 466, the set point temperature difference between the current time slot and the previous time slot is determined. At 468, the chilled water set point temperature difference between the current time slot and the previous time slot is determined. At 470, the chilled water flow rate is calculated, and at 472, the chiller load is calculated. At 474, the index is incremented, and at 476, if the index is less than the X set size, execution returns to block 464. If the index is greater than or equal to the X set size, then at 478, form the chiller set, the list of possible combinations of chiller load that would match the chiller load demand at a time interval is determined, and the list is ranked. At 480, in rank order, each chiller combination set is considered as is the run time of the chiller. If the chiller runtime indicates maintenance of the chiller, the next ranked chiller combination set is considered and the run time of the chiller is checked again. At 482, the optimized AHU, chilled water, zone set point, carbon dioxide set point, and chiller schedules are determined based on the load.

Processes 300 and 400 have several advantages. They generate an optimized schedule based upon the DR schedule, schedule chillers based on chiller load, predict energy consumption based upon the generated optimized schedule, visualize the energy percentage savings at a customer site, and generate an optimized schedule based upon user preferences (i.e., demand, comfort, or both demand and comfort).

It should be understood that there exist implementations of other variations and modifications of the invention and its various aspects, as may be readily apparent, for example, to those of ordinary skill in the art, and that the invention is not limited by specific embodiments described herein. Features and embodiments described above may be combined with each other in different combinations. It is therefore contemplated to cover any and all modifications, variations, combinations or equivalents that fall within the scope of the present invention.

Thus, an example system and method for predicting optimized energy consumption has been described. Although specific example embodiments have been described, it will be evident that various modifications and changes may be made to these embodiments without departing from the broader scope of the invention. Accordingly, the specification and drawings are to be regarded in an illustrative rather than a restrictive sense. The accompanying drawings that form a part hereof, show by way of illustration, and not of limitation, specific embodiments in which the subject matter may be practiced. The embodiments illustrated are described in sufficient detail to enable those skilled in the art to practice the teachings disclosed herein. Other embodiments may be utilized and derived therefrom, such that structural and logical substitutions and changes may be made without departing from the scope of this disclosure. This Detailed Description, therefore, is not to be taken in a limiting sense, and the scope of various embodiments is defined only by the appended claims, along with the full range of equivalents to which such claims are entitled.

Such embodiments of the inventive subject matter may be referred to herein, individually and/or collectively, by the term "invention" merely for convenience and without intending to voluntarily limit the scope of this application to any single invention or inventive concept if more than one is in fact disclosed. Thus, although specific embodiments have been illustrated and described herein, it should be appreciated that any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent to those of skill in the art upon reviewing the above description.

The Abstract is provided to comply with 37 C.F.R. §1.72(b) and will allow the reader to quickly ascertain the nature and gist of the technical disclosure. It is submitted with the understanding that it will not be used to interpret or limit the scope or meaning of the claims.

In the foregoing description of the embodiments, various features are grouped together in a single embodiment for the purpose of streamlining the disclosure. This method of disclosure is not to be interpreted as reflecting that the claimed embodiments have more features than are expressly recited in each claim. Rather, as the following claims reflect, inventive subject matter lies in less than all features of a single disclosed embodiment. Thus the following claims are hereby incorporated into the Description of the Embodiments, with each claim standing on its own as a separate example embodiment.

The invention claimed is:
1. A system comprising:
one or more computer processors configured to:
receive an energy demand response schedule, one or more user preferences, and one or more predicted environmental variables;
generate an optimized energy schedule as a function of the demand response schedule, the user preferences, and the predicted environmental variables, the optimized energy schedule comprising one or more of a set point temperature variation in one or more zones, an air handling unit set point temperature variation, a chilled water set point temperature variation, a carbon dioxide level set point variation, a pre-cooling time shift, a pre-cooling duration variation, and a load based optimized chiller schedule;
transmit the optimized energy schedule to a building management server; and
periodically generate an optimized energy schedule by adjusting the set point temperature variation in the one or more zones as a function of the rate of change of a temperature of the one or more zones, and by adjusting the carbon dioxide level set point variation as a function of a rate of change of a carbon dioxide level.

2. The system of claim 1, wherein the optimized energy schedule is directed to a particular day, and wherein the optimized demand schedule comprises a peak demand period and a non-peak demand period.

3. The system of claim 1, comprising a computer processor configured to display on an output device the optimized energy schedule and a predicted energy savings resulting from the optimized energy schedule.

4. The system of claim 1, comprising a computer processor configured to permit a user to alter the optimized energy schedule and visualize an energy prediction based upon the alteration before the optimized energy schedule is transmitted to the building management server.

5. The system of claim 4, wherein the optimized energy schedule is altered as a function of one or more operator preferences based on an energy saving requirement and an occupant comfort requirement.

6. The system of claim 1, wherein the energy demand response schedule is received from a third party utility company.

7. The system of claim 1, wherein
the set point temperature variation in the one or more zones comprises adjusting the set point temperature;
the air handling unit set point temperature variation comprises adjusting the air handling unit set point temperature;
the chilled water set point temperature variation comprises raising the chilled water set point temperature; and
the carbon dioxide level set point variation comprises raising the carbon dioxide level set point.

8. The system of claim 7, wherein one or more of the computer processors are configured to alter one or more of the adjusting of the set point temperature, the adjusting of the air handling unit set point temperature, the raising of the chilled water set point temperature, and the raising of the carbon dioxide level set point during a peak demand period.

9. The system of claim 7, wherein the adjusting the set point temperature in the one or more zones comprises increasing or decreasing the set point temperature and the adjusting the air handling unit set point temperature comprises increasing or decreasing the set point temperature.

10. The system of claim 1, wherein the optimization of the load based chiller is a function of a prediction of a load of the chiller based on the air handling unit set point and the chilled water set point, a number of chillers installed and a Tonnes rating (TR) of each installed chiller, a maintenance schedule of each chiller unit, and a maximum runtime for each chiller unit.

11. The system of claim 1, wherein the one or more computer processors are configured to generate an energy report that predicts a usage of energy, an energy report that provides for an optimized usage of energy, and an energy report that shows actual usage of energy.

12. The system of claim 1, wherein the one or more computer processors are configured to communicate with the building management server and to send the optimized energy schedule to the building management server via an intranet or the Internet.

13. The method of claim 1, comprising:
displaying on an output device the optimized energy schedule and a predicted energy savings resulting from the optimized energy schedule; and
altering the optimized energy schedule as a function of one or more operator preferences based on an energy saving requirement and an occupant comfort requirement;
wherein:
the set point temperature variation in the one or more zones comprises adjusting the set point temperature;
the air handling unit set point temperature variation comprises adjusting the air handling unit set point temperature;
the chilled water set point temperature variation comprises raising the chilled water set point temperature; and
the carbon dioxide level set point variation comprises raising the carbon dioxide level set point.

14. A method comprising:
receiving an energy demand response schedule, one or more user preferences, and one or more predicted environmental variables;
generating an optimized energy schedule as a function of the demand response schedule, the user preferences, and the predicted environmental variables, the optimized energy schedule comprising a set point temperature variation in one or more zones, an air handling unit set point temperature variation, a chilled water set point temperature variation, a carbon dioxide level set point variation, a pre-cooling time shift, a pre-cooling duration variation, and a load based optimized chiller schedule; and
transmitting the optimized energy schedule to a building management server.

* * * * *